United States Patent [19]

Ireland

[11] Patent Number: 4,873,401
[45] Date of Patent: Oct. 10, 1989

[54] ELECTROMAGNETIC DAMPED INERTIA SENSOR

[75] Inventor: John A. Ireland, Chatham, Canada

[73] Assignee: Bendix Electronics Limited, Chatham, Canada

[21] Appl. No.: 246,588

[22] Filed: Sep. 19, 1988

[51] Int. Cl.$^4$ ............................................. H01H 35/14
[52] U.S. Cl. ........................ 200/61.45 M; 200/61.53; 335/205
[58] Field of Search ............... 200/61.45 M, 61.53; 335/205, 80, 81, 90, 240, 241, 257; 73/503, 517 R, 518, 519, 520

[56] References Cited

U.S. PATENT DOCUMENTS

| | | | |
|---|---|---|---|
| 2,974,529 | 3/1961 | Brueggeman et al. | 200/61.53 X |
| 2,997,883 | 8/1961 | Wilkes | 200/61.45 M |
| 3,132,220 | 5/1964 | Uri et al. | 200/61.45 M |
| 3,171,913 | 3/1965 | Kersh | 200/61.53 |
| 3,737,599 | 6/1973 | Zuvela | 200/61.53 X |
| 4,082,927 | 4/1978 | Beckwith | 200/61.53 X |
| 4,097,699 | 6/1978 | Larson | 200/61.45 R |
| 4,329,549 | 5/1982 | Breed | 200/61.45 M |

Primary Examiner—J. R. Scott
Attorney, Agent, or Firm—Russel C. Wells; George L. Boller

[57] ABSTRACT

A sensor comprising: an inertial mass movable from a first position to a second position in response to a acceleration (deceleration) signal of predetermined amplitude and duration; electrical contacts and a conductor on the inertial mass for indicating that the inertial mass has moved to the second position; an electrical conductor, reactive with other elements of the sensor for generating an electro-magnetic force tending to dampen the motion of the inertial mass; and a magnetically attractive element or magnet for biasing the inertial mass towards the first position.

18 Claims, 2 Drawing Sheets

ELECTROMAGNETIC DAMPED INERTIA SENSOR

BACKGROUND AND SUMMARY OF THE INVENTION

The present invention relates generally to sensors responsive to a predetermined level of acceleration or deceleration. The sensor may be used in a supplemental passenger restraint system comprising an inflatable bag and gas generator which is activated upon receipt of the signal.

As mentioned above, the present invention is generally related to acceleration or deceleration sensors. These sensors may be referred to as velocity change sensors, inertia switches, acceleration or deceleration sensors, or crash sensors. Commonly used in the above class of sensors is an inertial mass or slug which moves from a first position to a second position to complete a circuit across a plurality of electrical contacts in response to a predetermined acceleration pulse. In the following text, acceleration or deceleration are used interchangeably. Various means have been used to maintain the inertial mass in the first position below acceleration pulses of a predetermined magnitude. U.S. Pat. No. 4,329,549 and U.S. Pat. No. 3,774,126 magnetically bias the inertial mass toward the first position. In contrast, U.S. Pat. No. 4,097,699 a spring biases an inertial mass towards the first position. U.S. Pat. No. 4,329,549 and 4,097,699 incorporate a mechanism for damping the inertial mass to insure that it will not be actuated unless the acceleration pulse (amplitude and time) exceeds a certain level for a predetermined period of time. Both of these patents use an extremely small diametral clearance between the inertial mass and a tube such that as the inertial mass is moved from the first position toward the second position, gas within the tube generates a damping force impeding the motion of the inertial mass. A shortcoming of this type of sensor is that the clearances between the tube and the inertial mass must be controlled exactly in order to generate the necessary viscous damping force. Such exact tolerances inevitably complicate production and increase the cost of the device. In addition, these devices require exotic sealing mechanisms to prevent moisture from entering the tube since if fluid or vapor enters the tube the viscous damping characteristics will change causing the device to malfunction.

It is an object of the present invention to provide an acceleration responsive sensor which solves the problems associated with the prior art. A further object of the invention is to generate a counter-electromagnetic force operative on an inertial mass to dampen its motion.

Accordingly, the invention comprises: a sensor comprising: an inertial mass movable from a first position to a second position in response to an acceleration signal of predetermined amplitude and duration; first means for indicating that the inertial mass has moved to the second position; second means for generating an electromagnetic force tending to dampen the motion of the inertial mass; and third means for biasing the inertial mass towards the first position.

Many other objects and purposes of the invention will be clear from the following detailed description of the drawings.

DETAILED DESCRIPTION OF THE DRAWINGS

Figure 1:
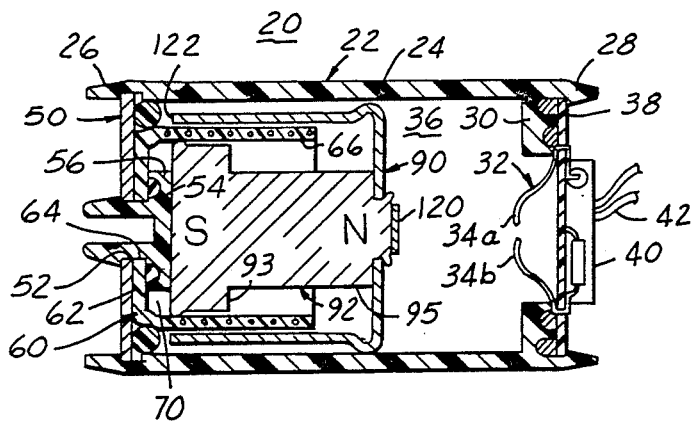
FIG. 1 illustrates a first embodiment of the present invention.

FIG. 1 illustrates a sensor constructed in accordance with the present invention. The sensor 20 comprises a housing 22 constructed of a non-magnetic material such as aluminum or plastic. The housing includes a circumferential extending wall 24 terminating in first and second ends 26 and 28 respectively. Supported about a circumferential ledge 30 proximate the housing end 28 is an electric contact assembly 32 comprising a plurality of electrical leads and contacts 34a and 34b. Portions of the contacts 34a and 34b extend outwardly from the interior or chamber 36 of the housing through an electric circuit board 38 to a control circuit 40. Electrical leads or wires 42 are provided to communicate the state of the sensor 20 to associated components. If the sensor is to be used as part of a passenger inflatable restraint system, the terminals or wires 42 may be communicated to a gas generator and/or electronic control unit (both not shown). The circuit 40 may be a buffer circuit, a signal amplifier circuit or other circuit as dictated by the remaining components of a cooperating system. Secured proximate the other end 26 of the housing is a ferromagnetic member illustrated as a plate 50 enclosing the end 26 of the housing 22. The plate 50 may comprise a central opening 52 through which is received a mechanical motion stop 54. Positioned within the chamber 36 of the housing 22, in abutting relation to the plate 50 is a cup-shaped member generally shown as 60 comprising a bottom 62 having a central opening 64 and an axially extending wall 66. In the embodiment of the invention illustrated in FIG. 1, the cup-shaped element 60 is secured to the plate 50 by the mechanical stop 54 which includes a snap-ring portion 56 extending through the openings 52 and 64. The mechanical stop 54 further includes a radial flange 70 comprising a flat seating surface 72 on one surface thereof. A groove 74 is provided on an opposite surface to receive a seal such as O-ring 76.

The wall 66 of the cup-shaped element 60 is generally spaced from the wall 24 by a distance or space 80. Axially movable within the housing 22 is a permanent magnet assembly generally shown as 90. The permanent magnet assembly comprises a permanent magnet 92 having its north pole, N, and south pole, S, axially aligned relative to a central axis 94 of the sensor. The magnet 92 may have an enlarged end 93 proximate the south pole and a narrow end 95 proximate the north pole. It should be appreciated that while the north pole is shown as extending to the right and the south pole extending to the left in FIG. 1, such polar configuration may be reversed. Extending from one of the permanent magnet's poles such as its north pole, N, is a shell 100 fabricated of a ferrous material. The shell 100 comprises a radially extending portion 102 defining a central opening 104 about which is swaged a portion of the north pole. The shell 100 further includes a circumferential boss or lip 110 extending from the radial portion 102 and an axially extending wall 112 leading from the lip 110. The lip 110 is adapted to slidably engage the inner diameter of the wall 24. The axially extending portion 112 of the shell 100 extends into the space 80 circumferentially about the wall 66 of the cup-shaped member 60. While the wall 112 is shown spaced from the wall 66, it is within the scope of the present invention that such wall lightly engage one another such that the wall 66 may enhance the stabilization of the shell 100 to prevent it from cocking. Attached to a portion of the north pole extending through the opening 104 is an electrical coating, material or contact 120 which upon engagement with the contacts 34a and 34b provides for a clean electrical connection. It is contemplated that the electrical contacts 34a and 34b the coating 120 be gold or similarly plated.

In FIG. 1 the permanent magnet 92 is shown in a first position engaging the motion stop by virtue of the magnetic interaction between the magnet and the ferrous plate 50. In response to a predetermined acceleration pulse having a given magnitude and of a given time duration, the permanent magnet assembly due to its inherent inertia will break loose of the force of attraction and begin moving toward a second position in electrical engagement with the contacts 34a, 34b.

Figure 2:
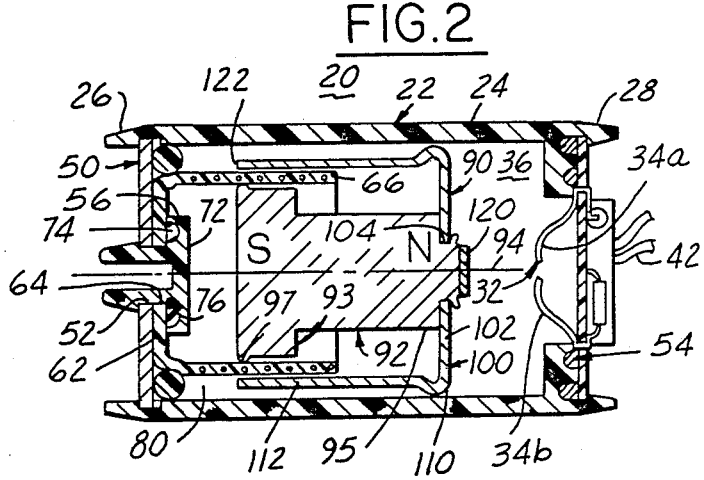
FIG. 2 shows the device of FIG. 1 in a partially activated state.

FIG. 2 illustrates one intermediate position of the permanent magnet assembly 90 as it traverses toward the electrical contacts 34a, 34b.

Figure 3:
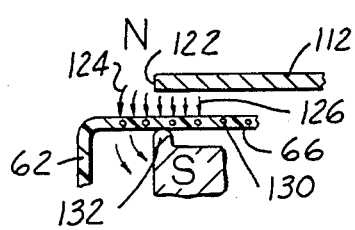
FIG. 3 is a partial view of a portion of the device shown in FIG. 1.

As previously mentioned, it is desirable to generate a damping force which opposes the forward motion of an inertial mass such as the permanent magnet assembly 90. As such, the present invention develops such damping force by generating a counter electromagnetic force (emf) to oppose the motion of the permanent magnet assembly. The present invention contemplates that this emf force may be generated in a number of ways. As an example, the cup-shaped element 60 may be fabricated of a non-magnetic electrically conductive material such as aluminum or copper. It is known that when a magnet moves across an electrical conductor an induced current will be created which in turn generates a counter-electromagnetic force which in the present invention is used to oppose and dampen the forward motion of the permanent magnet assembly. More specifically, by virtue of the attachment of the shell 100 to one of the poles such as the north pole of the permanent magnet 92, the effective location of the north pole N' is then situated at the annular end 122 of the shell 100. It can be seen that the end 122 has been chosen to terminate approximately in the plane containing the south pole of the magnet. As such, and as illustrated in FIG. 3, the magnetic lines of flux 122, generated by the permanent magnet are essentially directed perpendicularly across the wall 66 of the cup-shaped element 60 inducing therein the counter-electromagnetic force which it can be shown varies in magnitude in proportion to the axial velocity of the permanent magnet assembly 90. As is appreciated, the magnetic lines of flux will also include fringe flux lines such as 124 and 126 which encourage the generation of the electromagnetic force.

Alternatively, and as shown in above FIGURES, the cup-shaped element 60 may be fabricated of a non-magnetic, non-electrical material having a plurality of axial spaced conductors 130 embedded therein. As the permanent magnet assembly 90 moves to the right, as illustrated in FIG. 1, a current will be induced in one or more of the conductors 130, thereby generating the counter-electromagnetic force to impede and damp the forward motion of the assembly 90. A further embodiment of the invention contemplates replacing the discrete and spaced electrical conductors 130 with a single cylindrical conductor element. An additional embodiment of the invention contemplates an electric coil supported by the wall 66 wherein the ends of the coil are electrically shorted. As can be seen, various conductor configurations, discrete, continuous and shorted are usable in the present invention.

Additionally, the permanent magnet assembly 90 may be axially stabilized by fabricating a second circumferential boss or rim 132 on an end 97 of the permanent magnet 92 remote from the circumferential boss 110 and sized to lightly engage the interior of the walls 66.

Figure 5:
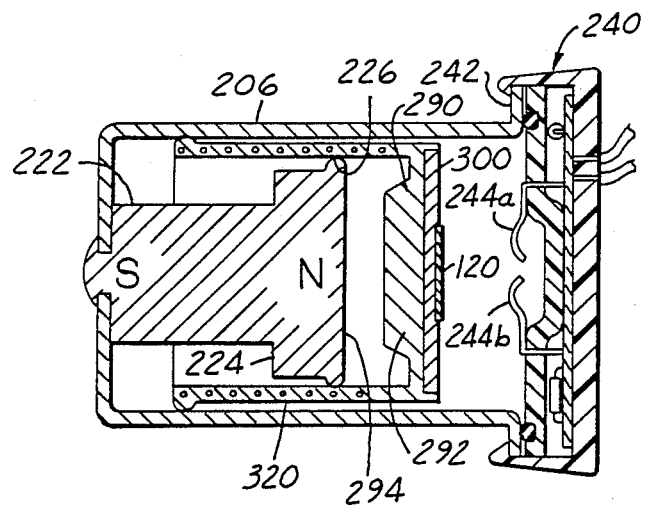
FIG. 5 shows the device of FIG. 4 in a partially activated state.
Figure 4:
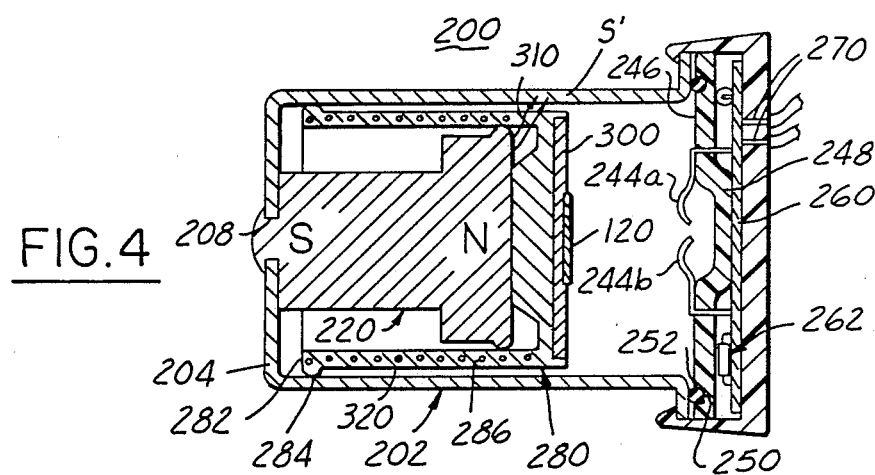
FIG. 4 illustrates an alternate embodiment of the invention.

Reference is now made to FIGS. 4 and 5 which illustrate an alternate sensor generally designated at 200. The sensor comprises a magnetically permeable housing 202 shaped as a cup having a bottom element 204 and axially extending wall 206. The bottom element 204 may include an opening 208 for securing thereto a permanent magnet 220. The permanent magnet 220 comprises a narrow cylindrical portion 222 and an increased diameter portion 224 having, proximate one end, a circumferential boss or lip 226. The housing 202 is enclosed by a cap 240 which may be snap-fit about a radially extending flange 242 of the wall 206. A plurality of electrical contacts 244a, 244b are supported upon a circular plate 246 having an axially extending boss 248. Opposite the radially extending flange 242, the plate 246 includes an annular grove 250 for supporting a resilient member such as O-ring 252. Positioned between the boss 248 and the cap 240 is a circuit board 260 which may support a buffer or control circuit generally shown as 262. The electrical contacts 244a, 244b extend through the plate 246 and are communicated to the circuit 262 having terminals 270.

Slidably positioned within the housing 202 and about the permanent magnet 220 is a non-magnetic non-electric cup 280. Proximate an end 282 of the cup 280 is a circumferential lip 284 which slidably engages the interior of the wall 206. The cup 280 comprises a wall 286 and a cross-member 290 connected therewith. The cross-member 290 includes an inwardly directed boss 292 adapted to engage one surface 294 of the permanent magnet 220 such that when in its first or deactivated position, the boss 292 serves to space a magnetically permeable member 300 a specified distance from the permanent magnet 220. As can be seen in the FIGURES, axial stabilization of the cup 280 is achieved by the interaction of the lip 284 with the wall 206 and with the interaction of the lip 226 with the wall 286. In response to an acceleration pulse of given magnitude and duration, the cup 280 will move to the right to its second position in contacting engagement across the electrical contacts 244a, 244b. To enhance the electrical contact therebetween, the member 300 may have secured thereto an electrically conductive material or contact 120. FIG. 5 illustrates the cup 280 in an intermediate position between the first and second positions.

In operation and assuming the configuration of the magnet illustrated in the figures, the south pole of the magnet 220 is in direct contact with the magnetically permeable housing 202 thereby polarizing the housing 202 as an extension of the south pole S'. As can be seen, the magnetic lines of flux generally shown as 310 flow from the north pole to the extended south pole, i.e. the housing 202, in a generally radial manner. As the magnet 220 moves to the right, illustrated in FIG. 5, in response to an acceleration pulse the conductive element or elements 320 embedded or attached to the walls 286 of the cup 280 interact with the lines of flux to generate a counter-electromagnet force in a manner similar to that described in the first embodiment of the invention. While FIGS. 4 and 5 illustrate discrete conductors within the cup, any of the above described alternate electrical conductors may be substituted therefor.

One advantage of the second embodiment of the invention as compared to the first embodiment of the invention is that it may be possible to fabricate the cup 280 with the ferromagnetic member 300 with a smaller inertia than the permanent magnet assembly as described above. Consequently, by utilizing a movable member having less mass or inertia, the damping generated by the counter-electromagnetic force may in a relative sense be more effective.

Figure 7:
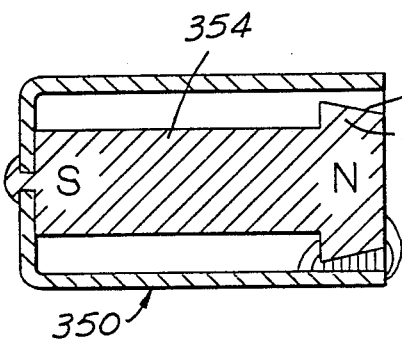
FIGS. 6 and 7 illustrate other embodiments of the invention.
Figure 6:
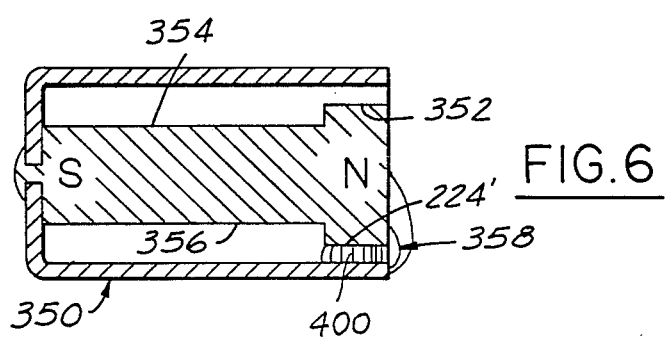

Magnetic lines of force will in general arrange themselves to take maximum advantage of the highly permeable materials within their area of influence. Since in both embodiments the permanent magnet material and the ferrous cup or shell are made up of highly permeable materials with the only low permeability material being the circumferential air gap between the outer circumference of the permanent magnet's enlarged end and the ferrous shell or cup, the lines of force 400 will in general occupy the air gap as illustrated in FIG. 6. The description below is applicable to both embodiments of the invention shown above. The device 350 of FIG. 6 can be equated to the magnet 220 and housing of FIG.'s 4 and 5 or, if visually reversed, to the magnetic assembly of FIG.'1 and 2. For purposes of illustration the bosses 97 and 222 have been eliminated. It can be shown that magnetic lines of force always concentrate themselves at maximum density in the narrowest air gap between two highly permeable elements. The portion of the large diameter end 352 of the permanent magnet 354 which is closest to the smaller diameter portion will have less relative magnetic polarity than the extreme end 358. The radial magnetic lines emanating from this portion will therefore be fewer in the air gap immediately adjacent to this portion. To maximize the damping effect it would be advantageous to have a radial magnetic field which is uniform in density throughout the length of the air gap. To compensate for the above mentioned non-uniform field, as shown in FIG. 6, and to encourage the magnetic field to become more uniform, it is proposed as shown in FIG. 7, that the enlarged end 352' of the magnet be made somewhat conical in shape 354' with the largest diameter occuring at an inboard position of the enlarged end 352'.

Common to all the embodiments of the invention is a mechanism for imparting true damping to a moving mass. To damp the motion of the moving mass involves means for absorbing and dissipating the kinetic energy related to the motion of the mass resulting in a slowing of its motion.

The forward motion of the sliding element must be slowed so that its travel occurs over a discrete time period commensurate with a real collision. This slowing is accomplished by dissipating some of the kinetic energy of its forward motion in the form of heat. When the sliding element with its conducting rings or cup travels through the magnetic field, the electrical current induced is partially converted to heat by the resistance of the conducting material. This heat is then gradually dissipated to the surrounding environment and is lost. In this way true damping of the sliding element is accomplished and hence the time dependency required to discriminate between an instantaneous shock and a real collision can be achieved.

It may be advantageous to mention that the magnitude of the damping effect may be varied by changing several physical parameters. These physical parameters are: (1) the strength of the permanent magnet, (2) the resistance of the conducting rings or shell either by varying the dimensions or material, (3) the number of rings or conductors within the effect of the magnetic field, (4) the width of the air gap, (5) the distance which the sliding member must travel before meeting the electrical contacts, and (6) the mass of the sliding member.

The force applied to the moving member can be expressed in the following terms from basic electromagnetic theory:

$$F = B*L*i$$

Where "B" is the magnitude of the magnetic field through which the conductor is caused to travel, "L" is the length of the conductor or the length of the current flow path through the conductor in the case of a conductive cup, and "i" is the current induced in the conductor by the movement with respect to the magnetic field.

The amount of power absorbed and converted to heat by the conductive rings or cup can be expressed as:

$$P = i^2 * R$$

Where R is the resistance of the conductive rings or cup.

Many changes and modifications in the above described embodiment of the invention can, of course, be carried out without departing from the scope thereof. Accordingly, that scope is intended to be limited only by the scope of the appended claims.

I claim:

1. A sensor comprising:
   a housing:
   an inertial mass that moves within said housing from a first position to a second position in response to an acceleration or deceleration signal of predetermined amplitude and duration in a sense urging said inertial mass toward the second position;
   first means for indicating that the inertial mass has moved to the second position; and
   second means, comprising a magnet and an electrical conductor, said magnet serving to hold said inertial mass in the first position until occurrence of such a signal, and said magnet and said conductor serving for generating an electro-magnetic force which is in response to motion of said inertial mass toward the second position and acts to dampen the motion of the inertial mass, one of said magnet and said electrical conductor being movable with said inertial mass and the other of said magnet and said electrical conductor being affixed to said housing.

2. The sensor as defined in claim 1 wherein the inertial mass includes said magnet and further including a magnetically conductive shell attached at one end of said magnet, said shell including a wall portion diametrally spaced from sides of the magnet such that a magnetic field is produced within a portion of the diametral space.

3. The sensor as defined in claim 2 wherein said electrical conductor is fixedly situated within the diametral space such that as the inertial mass moves toward the second position an opposing electro-magnetic force is created operative to dampen the motion of the inertial mass.

4. The sensor as defined in claim 1 wherein the inertial mass includes a non-magnetic cup comprising an axial wall and cross-member and wherein the second means includes a magnetically conductive shell secured to said magnet, the axial wall of the cup being slidably received within a diametral space between a first portion of the magnet and an axial wall of the shell, wherein a magnetic field is created between the first portion of the magnet and the axial wall of the shell, said electrical conductor being on the axial wall of said cup.

5. The sensor as defined in claim 4 wherein the magnet has a tapered end portion such that the diametral spacing, between such tapered end portion and the axial wall of the shell, is similarly tapered.

6. A sensor comprising;
a non-magnetic, hollow housing including a wall;
a ferrous plate secured proximate one end of the housing;
an electrical contact assembly disposed at an opposite end of the housing;
a non-magnetic motion stop positioned at the one end of the housing;
a permanent magnet assembly, slidably disposed within the housing and movable between a first position in contact with the stop to a second position in electrical contact with the electrical contact assembly; including a permanent magnet having its north and south poles axially aligned, and a ferrous shell secured to one of the magnetic poles, the ferrous shell comprising a cylindrical member extending rearwardly, circumferentially spaced from the permanent magnet and terminating proximate a plane containing the other magnetic pole, magnetic field from the magnet passing across the space between said other pole and said cylindrical member;
electrical conductor means located within the circumferential space between the cylindrical member and the permanent magnet to cut the magnetic field of the permanent magnet passing across the space between said other pole and said cylindrical member, for generating an electro-magnetic force, to oppose the motion of the permanent magnet assembly toward the second position.

7. The sensor as defined in claim 6 wherein the electrical conductor means cooperates with the permanent magnet assembly to generate an emf force proportional to the velocity of the permanent magnet assembly.

8. The sensor as defined in claim 6 wherein the electrical conductor means comprises an electrically conductive cylinder.

9. The sensor as defined in claim 6 wherein the electrical conductor means comprises an insulative cylinder including at least one electrical conductor circumferentially disposed thereon.

10. The sensor as defined in claim 9 wherein the at least one electrical conductor comprises a plurality of axially spaced conductive rings.

11. The sensor as defined in claim 9 wherein the at least one electrical conductor comprises an axially extending cylindrical conductor.

12. The sensor as defined in claim 9 wherein the at least one electrical conductor comprises an axially extending annular coil having electrically shorted ends.

13. The sensor as defined in claim 6 wherein the electrical conductor means includes a radially extending mounting portion secured between the motion stop and the ferrous plate.

14. The sensor as defined in claim 6 wherein the electrical contact assembly includes a plurality of spaced electrical contacts and wherein the permanent magnet assembly includes means for electrically contacting and engaging the electrical contacts.

15. An electromagnetically damped acceleration or deceleration sensor comprising:
a housing having a longitudinal axis;
a magnet whose poles are at opposite axial ends thereof and that is disposed coaxially within said housing;
a space which lies adjacent said magnet within said housing and across which the magnetic field issued by said magnet radially passes;
electrical conductor means disposed in said space;
said electrical conductor means and said magnet being arranged for relative axial movement, one of said electrical conductor means and said magnet fixedly mounted on said housing and the other of said electrical conductor means and said magnet being axially movable with respect to said housing;
an inertial mass which includes said other of said magnet and said electrical conductor means, which is magnetically held in a first position by the magnetic force of said magnet, and which moves axially of said housing from the first position to a second position in response to an acceleration or deceleration signal of predetermined amplitude and duration applied to the sensor along said longitudinal axis in a sense urging said inertial mass toward the second position;
said electrical conductor means, upon movement relative to said magnet resulting from movement of said inertial mass to said second position, having an interaction with the magnetic field in said space such that there is created an electromagnetic force that acts to dampen the motion of said inertial mass toward the second position; and
an electric circuit device for indicating that said inertial mass has moved to the second position.

16. A sensor as set forth in claim 15 wherein said space which lies adjacent said magnet within said housing is annular in shape, surrounding said magnet.

17. A sensor as set forth in claim 15 wherein said magnet is fixedly mounted on said housing, and said inertial mass includes said electrical conductor means disposed at the side of said magnet, said housing being of a magnetically conductive material so that the magnetic field passes radially across said space between said housing and said magnet.

18. A sensor as set forth in claim 15, wherein said electrical conductor means is fixedly mounted on said housing, and said inertial mass includes said magnet, said inertial mass also including a ferrous shell having an end wall and a side wall, said shell end wall being affixed to one pole of said magnet and said shell side wall extending axially along said magnet in outwardly spaced relation thereto to terminate near the opposite pole of the magnet so that said space is defined between said magnet and the side wall of said shell.

* * * * *